United States Patent [19]
Cleveland

[11] 3,894,090
[45] July 8, 1975

[54] WATER WASHING METHOD FOR BORATE REMOVAL IN AN AROMATIC ALKYLATION PROCESS

[75] Inventor: Earl J. Cleveland, Longview, Tex.

[73] Assignee: Universal Oil Products Company, Des Plaines, Ill.

[22] Filed: Feb. 15, 1974

[21] Appl. No.: 443,045

Related U.S. Application Data

[63] Continuation of Ser. No. 276,988, Aug. 1, 1972, abandoned.

[52] U.S. Cl...... 260/671 R; 260/671 C; 260/674 A; 260/674 R
[51] Int. Cl. ............................................. C07c 3/56
[58] Field of Search......... 260/671 R, 671 P, 671 C, 260/674 A, 674 R

[56] References Cited
UNITED STATES PATENTS

| | | |
|---|---|---|
| 2,918,504 | 12/1959 | Lee.................................. 260/671 P |
| 3,000,986 | 9/1961 | Olah et al. ...................... 260/671 R |
| 3,046,315 | 7/1962 | Dimond........................... 260/671 P |
| 3,197,522 | 7/1965 | Dimond et al. ................. 260/671 R |
| 3,631,122 | 12/1971 | Berger............................. 260/671 R |

Primary Examiner—C. Davis
Attorney, Agent, or Firm—James R. Hoatson, Jr.; Robert W. Erickson; William H. Page, II

[57] ABSTRACT

A method of water washing an aromatic recycle stream to remove boron oxide hydrates formed in a boron halide promoted aromatic hydrocarbon alkylation process comprises admixing water with the recycle stream and passing this mixture into the overhead receiver system of the aromatic feed stream drying column. Alternatively the aromatic recycle stream may be charged directly to the overhead receiver. The hydrates enter the aromatic recycle stream as a volatile complex formed by charging a boron halide to the reactor effluent distillation column.

6 Claims, 1 Drawing Figure

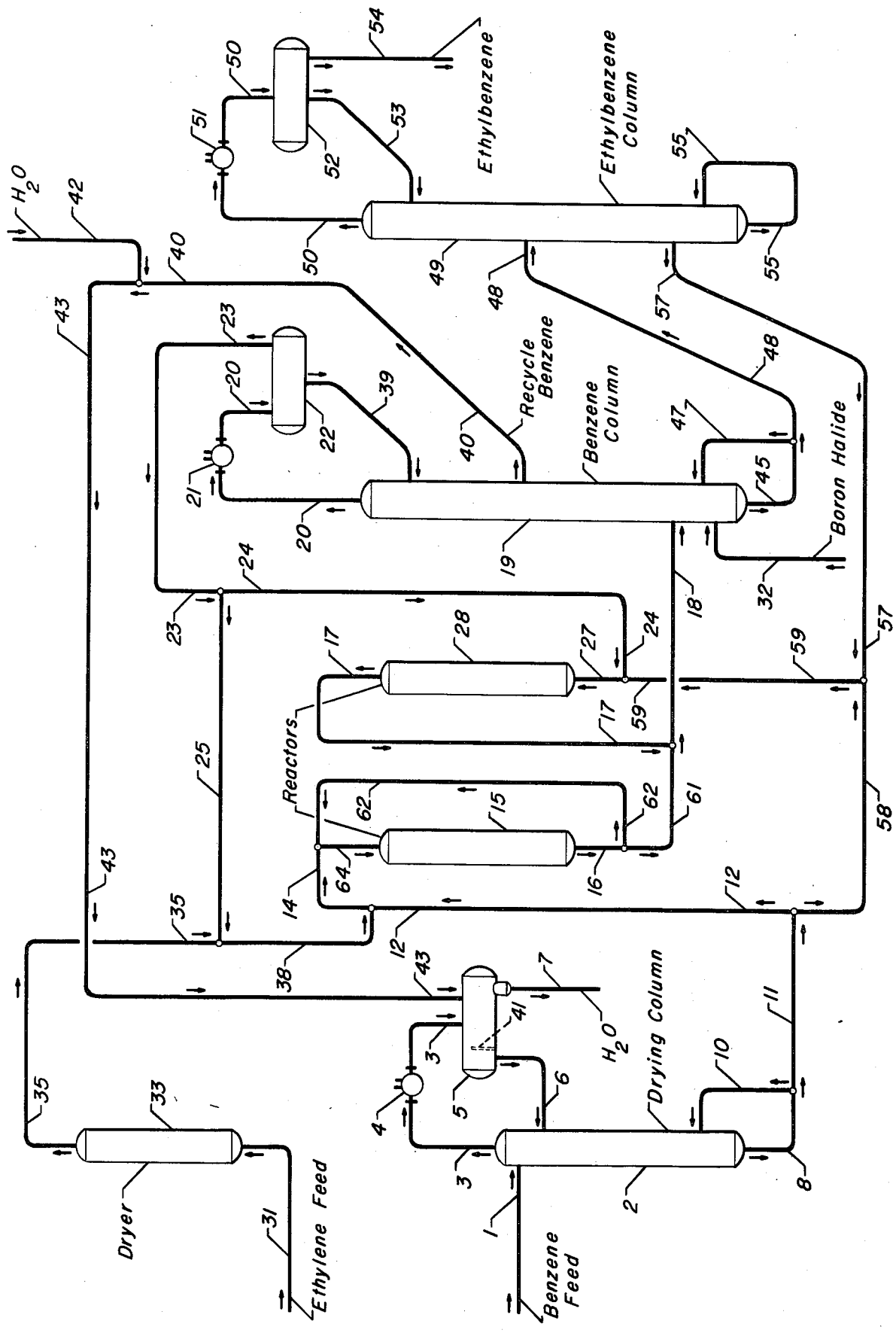

WATER WASHING METHOD FOR BORATE REMOVAL IN AN AROMATIC ALKYLATION PROCESS

CROSS-REFERENCE TO RELATED APPLICATION

This application is a continuation of my copending application Ser. No. 276,988, filed Aug. 1, 1972, now abandoned.

BACKGROUND OF THE INVENTION

1. Field of the Invention

The invention relates to a method of water washing hydrocarbon streams to remove boron oxide hydrate containing chemical complexes. It is directly applicable to a process for the production of monoalkylated aromatic hydrocarbons in which a boron halide is circulated through the reaction system to promote the catalyst. This process is troubled by the formation and deposition of insoluble boron oxide hydrates formed by the reaction of trace amounts of water in the olefin and hydrocarbon charge streams with the boron halide. The invention utilizes the overhead receiver system of a drying column to remove the boron oxide hydrates by water washing and drying an aromatic recycle stream.

2. Description of the Prior Art

An aromatic hydrocarbon alkylation-transalkylation process utilizing a boron trifluoride promoted catalyst is disclosed in U.S. Pat. No. 3,126,421 (Cl. 260-671).

One known method to prevent the deposition of the boron oxide hydrates in the process vessels is to pass a relatively pure boron halide stream into the lower portion of the distillation column to which the hydrate containing reactor effluent stream is charged. The halide forms a volatile complex with the boron oxide hydrate. This hydrate containing complex then leaves the distillation column dissolved in the aromatic hydrocarbon recycle stream removed as a side-cut. The aromatic recycle stream is then passed through beds of alumina which selectively absorb the complex. The alumina will remove the boron oxide hydrates until their concentration on the alumina becomes about 7 wt.%, and the alumina must then be replaced.

U.S. Pat. No. 3,631,122 discloses a different method in which an olefin acting compound is added to the reactor effluent to cause the formation of a borate-olefin complex which is then removed by fractional distillation.

Water washing of the entire reactor effluent in aluminum trichloride catalyzed alkylation processes is shown in U.S. Pat. Nos. 2,550,413 and 3,255,269. This is performed to remove the acidic catalyst which remains dissolved in the effluent after a prior decantation step. These processes are apparently not troubled by the formation of insoluble precipitates as occurs when water and boron halides are combined.

The high preferential solubility of borates in water as compared to benzene is well established in the art. It is also well known to water wash the alkylate containing product mixture produced with a catalyst derived from water and boron trifluoride as shown by U.S. Pat. Nos. 2,918,504 and 3,046,315. Water washing to remove water soluble acids from a boron trifluoride catalyzed alkylation process is taught in U.S. Pat. No. 3,000,986. These references however, do not concern themselves with the problems of boron oxide hydrate formation or removal in alkylation processes having anhydrous reaction conditions. They also do not present any method for performing the water wash step or show how this step may be integrated into an alkylation process.

SUMMARY OF THE INVENTION

A method is provided for water washing an aromatic hydrocarbon recycle to remove boron oxide hydrates produced during the alkylation of aromatic hydrocarbons in a process which utilizes a boron halide modified carrier material as a catalyst. This eliminates the need for alumina treaters on the recycle stream for borate removal, the consumption of alumina, and also the problem of disposing of the used alumina. To perform the washing method, the insoluble boron oxide hydrates in the reaction zone effluent are first reacted with a boron halide in a distillation column to form a volatile complex. This complex dissolves in the distillation column side-cut which contains the unalkylated aromatic hydrocarbons. The side-cut is then admixed with water in an inline mixer to transfer the complex to a water phase, and the side-cut is then passed into the overhead receiver of a distillation drying column. The undissolved water is removed by decantation and the side-cut is then dried in the drying column. In an alternative method, the side-cut is injected directly into the overhead receiver, and the side-cut is mixed with water therein.

DESCRIPTION OF THE DRAWING

For the purpose of illustration, it will be assumed that ethylene and benzene are being reacted to form ethylbenzene. Benzene charge stock is introduced by way of line 1 into an upper portion of a distillation column 2. Water rich vapor is removed overhead through line 3 and passed through condenser 4. The liquid so formed is collected in overhead receiver 5, from which water is decanted via line 7. Water rich benzene liquid is returned through line 6 to drying column 2 as reflux. A vertical weir 41 across the overhead receiver prevents the flow of settled water from entering the reflux stream in line 6. A dry benzene liquid stream is removed from the drying column by line 8. One portion of the benzene in line 8 is returned through line 10 and a reboiling means not shown to the drying column, and a second portion is charged to the process through line 11 for division between lines 12 and 58. The benzene entering line 12 is pressurized and mixed with a stream of high pressure boron trifluoride and ethylene introduced by line 38. The resulting mixture is carried by line 14 and combined with a stream of recycled reactor effluent carried by line 62, and the total resultant flow is carried by line 64 into the first reaction zone 15, which is an alkylation zone. The alkylation zone effluent is withdrawn in line 16, and a first portion of the effluent is passed through line 61 to join with the effluent of the transalkylation, or second, reaction zone effluent carried in line 17. This combined effluent flow is then passed by line 18 into separation zone 19, referred to as the benzene column or first separation zone. A second portion of the alkylation zone effluent is recycled through the reactor via lines 62 and 64. Line 20 carries the benzene column overhead vapor stream, comprising benzene and boron trifluoride, through a cooling means 21 and into a separation vessel 22. Liquid benzene is refluxed to column 19 via line 39. A boron trifluoride rich gas stream is recycled through line 23, with a first portion being withdrawn in line 24 and added to the transalkylation reactor charge stock fed into line 27. The second portion of boron trifluoride rich gas travels by line 25 to line 35 which carries the dried ethylene charge stock. The boron trifluoride and ethylene are carried by line 38 and are added to the benzene in line 12 to form the net alkylation zone charge. The ethylene charge stock enters the process by line 31 and is fed into a molecular sieve drier 33. The dried ethylene charge stock passes through line 35 for mixture with the recycled boron trifluoride in line 25. Despite the drying of the ethylene and benzene feed streams, a small amount of dissolved water still enters the reaction zones. The reaction of this water and the boron trifluoride results in the formation of insoluble boron oxide hydrates. These hydrates enter the benzene column 19 with the combined reaction zone effluents in line 18. A stream of substantially pure boron halide is fed to the benzene column via line 32 at a point under where line 18 enters the column. This causes the formation of a volatile complex containing the boron oxide hydrates. A benzene side-cut stream containing the boron oxide hydrate complex is removed from the benzene column 19 in line 40. The side-cut is mixed with water entering by line 42 to form a mixed-phase stream carried in line 43. This causes the transfer of the boron oxide hydrates from the benzene to the water phase. The benzene side-cut is then passed into the over-head receiver 5, wherein the boron oxide hydrate containing water is decanted. The side-cut benzene stream is dried in column 2 and recycled. An alkylated benzene stream is withdrawn from the benzene column 19 via line 45. A portion of this stream is returned to the benzene column 19 by line 47 through a reboiler means not shown. The remaining portion is passed by line 48 into a second fractional distillation column 49 referred to as an ethylbenzene column. Line 50 carries the ethylbenzene column's overhead vapor stream through a condenser 51 to thereby form liquid ethylbenzene which is collected in the overhead receiver 52. Some ethylbenzene is refluxed to column 49 by line 53, and an ethylbenzene product stream is withdrawn by line 54. A stream of polyalkylated benzenes withdrawn from column 49 by line 55 is vaporized in a reboiler means not shown and recycled to supply heat to column 49. A recycle stream of polyalkylated benzenes is removed from column 49 by line 57 and fed into line 59 to be admixed with the recycled benzene carried by line 58. The benzene and polyalkylated benzenes in line 59 are mixed with boron trifluoride from line 24 to form the transalkylation charge stock carried by line 27 into the transalkylation reaction zone 28. The effluent of this reaction zone is carried by line 17 to join with the alkylation zone effluent carried by line 61.

This drawing of the preferred embodiment of the invention and this description of the drawing are not intended to place any limitation on the process and are meant as an example only. Controls, valves, heaters, pumps, heat exchangers and other pieces of required equipment have not been shown in the interest of simplicity and clarity. For this same purpose, the replenishment of the boron trifluoride and the removal of any inert gases and drag streams has not been indicated. Certain flows referred to in the description of the drawing as pure streams, as for example the benzene recycle stream, are of course not pure due to the limited benefit of such purities as compared to the cost of total separation.

DETAILED DESCRIPTION OF THE INVENTION

Processes for the alkylation of aromatic hydrocarbons with an olefinic hydrocarbon are of significant importance in the petroleum and petrochemical industries as starting points in the manufacture of resins, plastics, detergents, elastomers, etc. One of the more common processes is the alkylation of benzene to produce monoalkylated benzene hydrocarbons. For example, benzene is alkylated with ethylene to produce ethylbenzene, a desired chemical intermediate which in turn may be dehydrogenated to produce styrene, a synthetic rubber constituent. Benzene is also alkylated with propylene to produce cumene for the production of cumene hydroperoxide which is readily decomposed into phenol and acetone.

These commercially significant processes may be carried out in the presence of a boron halide and a boron halide modified inorganic oxide, such as alumina, in an anhydrous alkylation promoting environment. However, as a practical matter completely anhydrous streams of charge stock are never available and a minute amount of water inevitably enters the system. It has also been theorized that some water is formed in the reaction zone from free radical hydrogen produced during the reactions. As a result, there is formed in this alkylation reaction environment a reaction product of water and boron halide comprising a relatively non-volatile hydrate of boron oxide, which is normally present in small amounts (0.02 to about 50 wt. ppm. expressed as elemental boron) in the alkylation zone effluent, typically in a dissolved or suspended state. These hydrates are often referred to as simply borates. This alkylation zone effluent is then passed to a first fractional distillation column from which boron halide vapors are removed overhead, unalkylated aromatic hydrocarbons are removed as a side-cut stream which is recycled, and alkylated aromatic hydrocarbons are removed as a bottoms stream.

In this first distillation column, the relatively non-volatile boron oxide hydrates precipitate out to form insoluble deposits inside the distillation column and the associated reboiler. These deposits gradually accumulate and eventually hamper efficient operation of the column. One method found in the prior art to control this deposit formation is to pass a relatively pure boron halide stream into the lower portion of this first distillation column at a point below the level at which the reactor effluent stream passes into the fractional distillation column. This halide then forms a volatile complex with the non-volatile boron oxide hydrates, and the resultant complex is continuously removed from this distillation column as dissolved matter in the unalkylated aromatic hydrocarbon side-cut stream. This stream is also referred to as the aromatic hydrocarbon recycle stream. In the prior art, the boron oxide hydrate containing complex in this stream is then removed by passing the benzene stream through beds of alumina absorbent which selectively remove the boron oxide hydrates.

The use of alumina treaters in the aromatic recycle line has several disadvantages. The first is the required periodic replacement of the alumina when the weight percent of boron oxide hydrates reaches a limiting value of about 7 to 10%. In a large unit, the net aromatic flow rate to the alkylation reaction zone may total 50,000 pounds per hour with from 2 to 4 pounds of borates being produced per hour. This results in an alumina consumption rate of approximately 480 to 1300 pounds per day. To maintain continuous operation of the process, it is necessary to have two or more alumina treaters which may be used alternately. These treaters and the necessary valving to switch the flow of the benzene side-cut stream between them require a significant capital investment, which is a second disadvantage to the use of alumina treaters. Other disadvantages include the required purging and drying operations before the alumina can be safely removed. The removal and replacement steps require a significant labor force which is expensive and also disruptive to other normal activities. Finally, the spent alumina must be disposed of, and this is presently accomplished only by a landfill operation. The elimination of alumina replacement problems and expenses is a direct object of this invention. It is a further object of this invention to eliminate the need for borate removal equipment and thereby reduce the capital investment required for construction of a boron trifluoride promoted alkylation process.

To provide a background for understanding the operation of the invention, a boron halide promoted alkylation process will be described in detail. The alkylation reaction, as well as the associated transalkylation reaction, may be performed very readily by the use of a boron halide and a boron halide modified carrier material. Preferably, the boron halide is boron trifluoride. The carrier is preferably an inorganic oxide and may be selected from among many inorganic oxides including alumina, silica, boria, oxides of phosphorus, titanium dioxide, zirconium dioxide, chromia, etc., and various naturally occurring inorganic oxides of various states of purity, such as clay or diatomaceous earth. Of the above-mentioned inorganic oxides, the gamma and theta forms of alumina are most readily modified by boron trifluoride and the use of one or both of these is preferred. The modification of the carrier may be carried out prior to or simultaneously with the passage of the reactants over the carrier. Most simply, this modification is accomplished by the passage of a boron halide containing gas stream over a bed of the carrier material maintained at an elevated temperature of from about 300° to about 500°F. If the modification is carried out simultaneously with the passage of reactants over the carrier, the catalyst will exhibit an induction period during which the alkylation and transalkylation reactions will not take place to any great extent for some hours. To maintain the catalyst in an active state during operation, boron trifluoride is recirculated to each reaction zone at the relatively small rates of about 2000 ppm. in the alkylation zone and about 3500 ppm. in the transalkylation zone.

The aromatic feed stream charged to the process will normally comprise an aromatic hydrocarbon such as benzene, toluene, xylene, ethylbenzene, ethyltoluene, normal propylbenzene or isopropylbenzene, etc. but may be a higher molecular weight alkylaromatic with one or more condensed benzene rings such as naphthalene, or a single benzene ring compound with one or more side chains of from 1 to 10 carbon atoms each.

The olefinic hydrocarbon used to alkylate the aromatic hydrocarbon may be a polyolefin, actylenic hydrocarbon, alcohol, ether, ester or other olefin-acting compound, but is normally a low molecular weight mono-olefin such as ethylene, propylene, normal butene or isobutene. Higher molecular weight olefins, such as octene, or olefin polymers having 9 to 18 or more carbon atoms per molecule, such as propylene trimer or propylene tetramer are further examples of olefinic hydrocarbons. Cyclo-olefins such as cyclopentene or methylcyclohexene may be utilized. Certain olefin-acting substances capable of producing olefinic hydrocarbons or intermediates under the conditions of operation utilized in the process are also suitable for use as an alkylating agent. Typical compounds include alkyl halides capable of undergoing dehydrohalogenation to form olefins. Examples of such alkyl halides include ethyl fluoride, isopropyl fluoride, n-propyl chloride, isobutyl chloride, isobutyl bromide, etc.

A typical boron halide promoted alkylation process utilizes two reaction zones to produce mono-alkylated aromatic hydrocarbons. The first reaction zone is used to alkylate the aromatic hydrocarbon feed stream. The second reaction zone is used to transalkylate the polyalkylated aromatics produced in the first reaction zone. The effluent streams of both reaction zones are normally combined and fed directly to a single fractional distillation column, often called the benzene column. The alkylation reaction zone is normally operated in a down flow manner at a temperature of from 100° or lower to 600°F. or higher with the preferred operating temperature being from 250° to 450°F. The transalkylation reaction zone is normally operated in an up flow manner and maintained at a higher temperature of from 350° to 450°F. but could vary in temperature from 200° to 700°F. The pressure in the reaction zones may range from atmospheric to 1500 psig. although it is presently desirable to use the pressure range of 300 psig. to 600 psig. The pressure is preferably chosen to be sufficient to maintain the aromatic compounds in a liquid state.

To obtain a high selectivity for the production of a mono-alkylated aromatic hydrocarbon in the alkylation zone, it is best to have present from about 1.5 to about 5 moles of unalkylated aromatic hydrocarbon for every mole of the olefinic hydrocarbon. This olefinic hydrocarbon is normally completely reacted in this first reaction zone and is not present in the reactor effluent. To maintain the high excess of aromatic material, it is common practice to recirculate a large amount of unfractionated reactor effluent, which may be up to about 15 times as large as the reactor feed stream or net reactor product. The liquid hourly space velocity may vary between 0.5 and 10. In the transalkylation zone, an excess of unalkylated aromatic hydrocarbons over polyalkylated aromatic hydrocarbons is maintained, with the relative ratio being from about 0.5 to about 3 moles of unalkylated aromatic hydrocarbons per mole of polyalkylated aromatic hydrocarbon. The liquid hourly space velocity of the reactants in the transalkylation zone is from about 0.2 to about 3. Operating conditions in either zone may be varied to correspond to the type of alkylation step to be effected so as to provide optimum yields.

The combined reactor effluent is fed into a first distillation column to produce the unalkylated aromatic hydrocarbon recycle stream. When the aromatic hydrocarbon is benzene, the fractional distillation column is commonly referred to as the benzene column. To produce a benzene recycle stream, it is normally operated at a bottom pressure of about 15 psig. and with about a 5 psig. pressure drop through the column. The liquid temperature at the bottom of the column will be about 350°F. to insure removal of the benzene from the alkylated benzenes being withdrawn. The temperature at the point of removal of the benzene side-cut will be about 210°F., and the top of the column will be maintained at about 200°F. The alkylated benzenes are separated in a second fractional distillation column called an ethylbenzene column, which is maintained at about 10 psig. with a bottom temperature of about 425°F. and a top temperature of about 280°F.

The boron oxide hydrates formed in the reaction zone enter the benzene column in the combined reaction zone effluents. If left untreated, these non-volatile compounds would settle on internal surfaces of the column and the associated reboiler. This decreases the efficiency of the column and would eventually require processing to be stopped to allow removal of these deposits. These deposits are prevented by charging a stream of relatively pure boron halide, preferably boron trifluoride when it is used to promote the reaction, into a lower portion of the benzene column. This boron halide stream should enter the column below the point at which the combined reaction zone effluents enter the column. The charged boron halide combines with the boron oxide hydrates to form a soluble and volatile complex which ascends the column. This complex has about the same volatility as the benzene, and therefore is removed in the benzene side-cut. At this point, the prior art has resorted to passing the benzene side-cut stream through beds of absorbent alumina. This however has the disadvantages previously pointed out.

One common method of drying the aromatic hydrocarbon feed stream is the use of a distillation drying column as illustrated in the drawing. The water containing aromatic hydrocarbon feed stream is introduced to the drying column near or above its mid-point and dry benzene is removed from the bottom of the column. To avoid upsetting the operation of the column when large surges of water are present in the feed stream, it is a common practice to charge the feed stream directly to the overhead receiver. When benzene is being alkylated, the drying column can be effectively operated at a pressure of about 12 psig., a bottom temperature of about 220°F. and a top temperature of about 210°F. During operation, an overhead vapor stream of water and the aromatic hydrocarbon is condensed, and the resulting liquid is collected in an overhead receiver wherein the water and benzene form two distinct phases. The water is removed by decantation and the benzene is returned to the column as reflux, preferably at a temperature very close to that of the overhead vapor.

It has been known that water could be used to remove boron oxide hydrates from hydrocarbons. This has not been applied to boron halide promoted alkylation processes because it requires wetting the recycle stream. This in turn requires drying the recycle stream to a degree sufficient to prevent an undesirable increase in the rate of boron oxide hydrate formation because of increased amounts of water entering the reaction zones.

The present invention resides in a method of performing the water washing. Although it does not eliminate the need to dry the aromatic hydrocarbon recycle stream, this method does offer several specific advantages over the use of alumina treaters and does provide a washing method new to the art. In addition to the elimination of alumina costs and treater operating expense, this method does not require the vessels or valving associated with alumina treating or any specialized washing equipment or controls. This method allows the liquid level control system used in the drying column overhead receiver to be utilized to control the decantation of the water used to wash the benzene side-cut. By the preferred method of this invention, it is only necessary to provide an inline mixing device, and this is not necessary when there is a sufficient amount of turbulence present in the benzene side-cut transfer line. Optionally, a specific water contacting zone may be included in the aromatic hydrocarbon transfer line and contain a large excess of water to insure complete solution of the boron oxide hydrates. The amount of water admixed with the unalkylated aromatic hyrocarbon side-cut stream must be sufficient to produce a mixed-phase water and hydrocarbon stream. The separate water phase must have sufficient volume to absorb all the boron oxide hydrate containing complex.

This simplification may be carried one step further by passing the unalkylated aromatic hydrocarbon side-cut stream directly into the overhead receiver of the drying column without any prior mixing with water in the aromatic hydrocarbon side-cut transfer line. In this embodiment of the invention, an adequate degree of turbulence must be maintained in some part of the overhead receiver to cause an intimate mixing of the water and hydrocarbon phases. It is to be noted that in the exemplary conditions given for the benzene drying column and the benzene column, the temperature of the benzene side-cut stream is equal to the top temperature of the drying column. The side-cut stream is therefore at a preferred temperature for use as reflux without any heat exchange. If the side-cut stream is cooler than the overhead vapor in the drying column, then the side-cut stream may be utilized for direct heat exchange with the overhead vapor to cut down on the utility costs of condensing the overhead vapors. Whether these methods of water washing are used is dependent on the results of an economic comparison of their reduced capital and supply costs to the increased fuel consumption required for the distillation of the recycled aromatic hydrocarbons.

In accordance with the preceding description, the preferred embodiment of the invention may be described as a method of removing boron oxide hydrates from a boron halide promoted aromatic hydrocarbon alkylation process which comprises the steps of: (a) passing a reactor effluent stream comprising boron oxide hydrates, an unalkylated aromatic hydrocarbon and alkylated aromatic hydrocarbons into a fractional distillation column; (b) admixing a stream of substantially pure boron halide with the contents of the fractional distillation column at a point below the level at which the reactor effluent stream passes into the fractional distillation column to effect the production of a volatile boron oxide hydrate containing chemical complex; (c) removing from the fractional distillation column a side-cut stream comprising an unalkylated aromatic hydrocarbon and the volatile boron oxide hydrate containing chemical complex; (d) admixing the side-cut stream with water to effect the production of a mixed-phase liquid stream comprising water and an unalkylated aromatic hydrocarbon and, (e) passing the mixed-phase liquid stream into an overhead receiver of a distillation drying column to effect the drying of unalkylated aromatic hydrocarbons contained in the side-cut stream.

I claim as my invention:

1. In a process for the boron halide promoted alkylation of an aromatic hydrocarbon wherein boron oxide hydrates are formed by the reaction of water with a boron halide, the method of removing boron oxide hydrates from the process which comprises the steps of:
   a. passing resultant alkylation effluent comprising boron oxide hydrates, an unalkylated aromatic hydrocarbon and alkylated aromatic hydrocarbons into a fractional distillation column;
   b. introducing a stream of substantially pure boron halide into the fractional distillation column at a point below the level at which the alkylation effluent passes into the column and therein reacting the boron halide with said boron oxide hydrates to form a volatile complex which is soluble in the unalkylated aromatic hydrocarbon;
   c. removing as a side-cut stream from said column the resultant solution of the volatile boron oxide hydrate complex in unalkylated aromatic hydrocarbon;
   d. admixing water with said side-cut stream and transferring the boron oxide hydrates from said solution to the water, thereby forming a mixed-phase liquid stream comprising water and unalkylated aromatic hydrocarbon; and
   e. separating water from said liquid stream and returning resultant dried unalkylated aromatic hydrocarbon to the aforesaid boron halide promoted aromatic alkylation reaction.

2. The process of claim 1 further characterized in that the aromatic hydrocarbon to be alkylated is dried in a distillation drying column and said mixed-phase liquid stream is introduced into an overhead receiver of said distillation drying column to effect the drying of unalkylated aromatic hydrocarbons contained in the side-cut stream.

3. The process of claim 2 further characterized in that said side-cut stream is admixed with water contained in said overhead receiver.

4. The process of claim 2 further characterized in that the side-cut stream is admixed with water in the transfer line connecting the fractional distillation column and the overhead receiver.

5. The process of claim 1 further characterized in that the boron halide used to promote the alkylation of the aromatic hydrocarbon and the boron halide introduced to the fractional distillation column are both boron trifluoride.

6. The process of claim 3 further characterized in that the boron halide used to promote the alkylation of the aromatic hydrocarbon and the boron halide introduced to the fractional distillation column are both boron trifluoride.

* * * * *